United States Patent [19]

Obie et al.

[11] Patent Number: 4,611,612

[45] Date of Patent: Sep. 16, 1986

[54] APPARATUS FOR CONTINUOUSLY TREATING SOLIDS WITH LIQUIDS

[75] Inventors: John P. Obie, Prospect Heights, Ill.; Thomas L. Faudree, Mentor, Ohio

[73] Assignee: Chicagoland Processing Corp., Elk Grove Village, Ill.

[21] Appl. No.: 805,282

[22] Filed: Dec. 5, 1985

Related U.S. Application Data

[63] Continuation of Ser. No. 605,861, May 1, 1984, abandoned.

[51] Int. Cl.⁴ .......................... B08B 3/04; B01F 7/08
[52] U.S. Cl. ....................................... 134/65; 134/66; 134/99; 366/319; 422/273
[58] Field of Search ....................... 134/60, 61, 65, 66, 134/67, 84, 88, 99, 109, 132, 133; 366/83, 86, 136, 137, 159, 266, 292, 603; 422/273, 274, 275

[56] References Cited

U.S. PATENT DOCUMENTS

| | | |
|---|---|---|
| 731,092 | 6/1903 | Baker et al. . |
| 1,207,512 | 12/1916 | Dickson . |
| 2,086,181 | 7/1937 | Bonotto . |
| 2,545,239 | 3/1951 | McQuiston et al. . |
| 2,555,908 | 6/1951 | Von Edeskuty et al. . |
| 2,626,856 | 1/1953 | Alles ............................. 366/319 X |
| 2,845,936 | 8/1958 | Boynton et al. . |
| 3,004,876 | 10/1961 | Zies . |
| 3,019,895 | 2/1962 | Loevenstein et al. . |
| 3,117,031 | 1/1964 | Griffiths . |
| 3,130,070 | 4/1964 | Potters et al. .................. 366/319 X |
| 3,226,202 | 12/1965 | Nagelvoort ...................... 422/273 X |
| 3,639,172 | 2/1972 | Keogh, Jr. . |
| 3,658,072 | 4/1972 | Santucci . |
| 3,846,173 | 11/1974 | Ihrig . |
| 3,895,958 | 7/1975 | Gill et al. . |
| 4,046,154 | 9/1977 | Tada et al. ............................ 134/65 |
| 4,073,301 | 2/1978 | Mackinnon . |
| 4,168,714 | 9/1979 | Bahrke . |
| 4,363,264 | 12/1982 | Lang et al. ....................... 366/137 X |

FOREIGN PATENT DOCUMENTS

| | | |
|---|---|---|
| 2713730 | 10/1978 | Fed. Rep. of Germany . |
| 2804729 | 8/1979 | Fed. Rep. of Germany . |
| 01910 | 6/1983 | PCT Int'l Appl. ................. 366/319 |
| 103596 | 3/1924 | Switzerland . |

Primary Examiner—Philip R. Coe
Attorney, Agent, or Firm—Welsh & Katz, Ltd.

[57] ABSTRACT

Apparatus for continuously treating solids, with at least one liquid includes a first screw conveyor having first agitators positioned along the peripheral margin of each section of the thread of the screw conveyor for agitating the solid pieces being conveyed in the area between adjacent sections of the conveyor, and second agitators positioned along the shaft of the first screw conveyor for mixing the liquid with the solids within the area between adjacent sections of the thread of the first screw conveyor, and a second screw conveyor having agitators positioned along the peripheral margin of each section of the thread of the conveyor for agitating the solids being conveyed thereby, in the area between adjacent sections of the thread of the second screw conveyor, and liquid passages associated with the peripheral margin of each section of the thread of the second screw conveyor for allowing liquid introduced to the second screw conveyor to pass through the sections of the conveyor. The apparatus includes devices for continuously introducing liquid to the first and second chambers and devices for continuously removing liquid from each of the chambers to maintain a level of liquid in the chambers. The apparatus provides efficient step-wise contact of the solids with the liquid and is particularly adapted for treating film chips to effect the removal of silver values therefrom.

20 Claims, 5 Drawing Figures

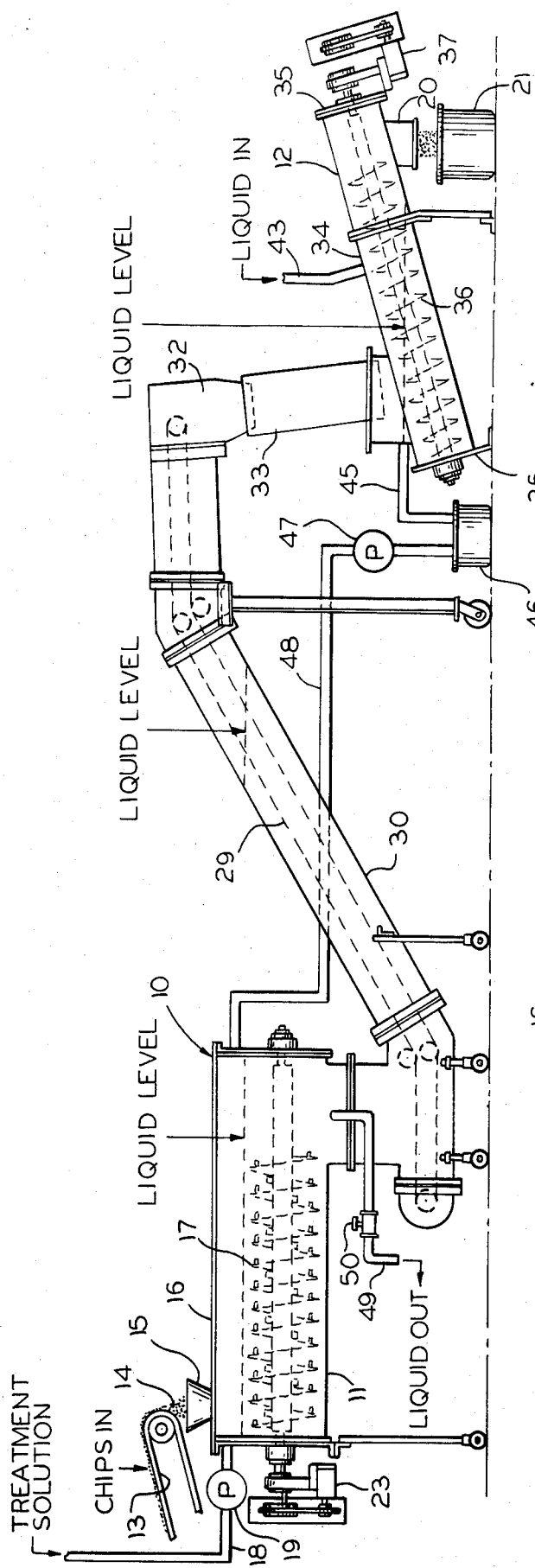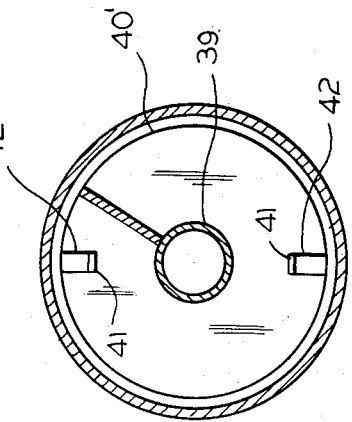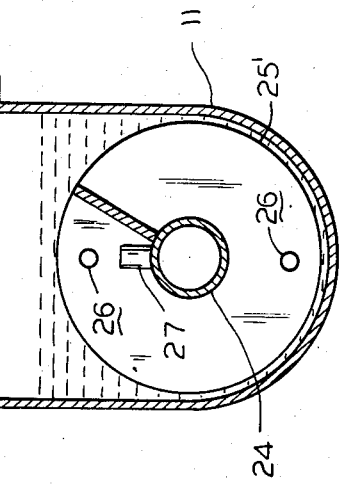

APPARATUS FOR CONTINUOUSLY TREATING SOLIDS WITH LIQUIDS

This is a continuation, of application Ser. No. 605,861, filed May 1, 1984, and now abandoned.

BACKGROUND OF THE INVENTION

The present invention relates to apparatus for continuously contacting solids with liquids, and more particularly to apparatus for the efficient, step-wise contact of solid pieces, especially film chips, with at least one liquid.

In a known method silver is removed from photosensitive film by cutting the film into chips, contacting the film chips with liquid which is capable of removing the photosensitive emulsion from the chips, washing the chips with a second liquid, and recovering the silver from the first liquid and from the second, washing liquid. Apparatus developed to carry out this process has been disadvantageous and uneconomical in that the apparatus commonly performed the process on a batch basis, and upon removal of liquid from the chips or the chips from the liquid, the chips tended to stick to each other preventing efficient rinsing, or the chips tended to adhere to the vessel requiring manual removal. Additionally, inordinate quantities of washing liquid were required, which had to be treated to recover any silver, usually in the form of silver halide, which might be present in the liquid, in order for the process to be economically practiced.

An improvement in apparatus to perform the process has been disclosed in U.S. Pat. No. 4,046,154, issued Sept. 6, 1977 to Tada et al. In the improved apparatus, a pair of vertical columns having agitators and baffles are employed to permit the chips to fall by gravity through the vertical columns which are filled with liquid continuously added to the columns. The amount of film chips which can be processed in the disclosed apparatus is limited by the configuration of the apparatus and the dependency upon gravity in permitting the chips to fall or sink through the vertical contacting chambers.

As in any process in which a solid and a liquid must be contacted, and particularly where a layer must be removed from the solid, efficiency of the contacting of the liquid with the solid and subsequent rinsing of the solid becomes critically important. Even after the solid has been treated, in the particular example noted above wherein the emulsion is removed from the film and is suspended in the liquid, a quantity of liquid will adhere to the solid even after extensive draining periods. If the solid with the liquid adhering thereto is discarded, the materials in the liquid would represent a substantial economic loss to the efficiency of the process. A principal means of recovering the liquid adhering to the solid is to provide a number of rinsing operations in an attempt to reduce the amount of valuable material in the liquid adhering to the solid. Substantial rinsing requires an equally substantial quantity of rinsing liquid, ultimately requiring treatment of the liquid utilized in the rinsing operation. Even if several separate rinsing operations are employed, the volume of rinsing liquid required to be treated remains inordinate and uneconomical. Moreover, as the number of rinsing operations are increased, the volume of rinsing liquid increases significantly. Therefore, the known apparatus for contacting solids and liquids, particularly when employed in the recovery of silver from photosensitive film does not provide for the economical and efficient operation of processes for contacting and treating solids with liquids.

BRIEF SUMMARY OF THE INVENTION

An object of the invention, therefore, is the provision of apparatus for the efficient and continuous contacting of solids with a liquid and for the rinsing of solids in a continuous, step-wise operation.

Another object of the invention is the provision of apparatus for the step-wise rinsing of solids within discrete chamber portions utilizing a minimum quantity of rinsing liquid and providing for the draining of the solids prior to removal from the apparatus.

Further objects and advantages of this invention will become apparent from the following description when the same is considered in connection with the accompanying drawings.

In accordance with the present invention, apparatus is provided for the continuous treatment of solid pieces with at least one liquid in an efficient operation utilizing a minimal amount of liquid. The apparatus of the present invention includes first contacting means for contacting the solid pieces with a liquid including a first contacting chamber portion and a first screw conveyor portion rotatably mounted within the first contacting chamber portion, means for continuously introducing the solid pieces to be treated into the first contacting chamber portion and into the first screw conveyor portion, first agitating means positioned along the peripheral margin of each section of the thread of the first screw conveyor portion for agitating the solid pieces in the area between adjacent sections of the thread of the first screw conveyor portion, second agitating means positioned along the shaft of the first screw conveyor portion for mixing liquid with the solid pieces being conveyed within the area between adjacent sections of the thread of the first screw conveyor portion, second contacting means for contacting the solid pieces from the first contacting means with a liquid including a second contacting chamber portion and a second screw conveyor portion rotatably mounted within the second contacting chamber portion for conveying the solid pieces therethrough, means for continuously introducing a liquid into the second contacting chamber portion to be contacted with the solid pieces being conveyed therethrough, third agitating means positioned along the peripheral margin of each section of the thread of the second screw conveyor portion for agitating solid pieces being conveyed therethrough in the area between adjacent sections of the thread of the second screw conveyor portion, liquid passage means associated with the peripheral margin of each section of the thread of the second screw conveyor portion for allowing liquid to pass through said sections, and discharge means for removing solid pieces from the second contacting means.

The apparatus of the present invention additionally includes means for continuously introducing into the first contacting chamber portion a liquid to be contacted with the solid pieces being conveyed therethrough, liquid discharge means in communication with the first contacting chamber portion for continuously removing a controlled amount of liquid from the chamber portion, whereby a level of liquid is maintained in the first chamber portion at least above the level of the solid pieces being conveyed therethrough and means for continuously introducing a liquid into the second contacting chamber portion.

In a preferred embodiment of the invention, the two screw conveyor portions constitute separate screw conveyors with the solid pieces being removed from the first screw conveyor following contact with the first liquid and having means for introducing the removed solid pieces continuously to the second screw conveyor; although a single screw conveyor with two discrete portions can be employed. Where a single screw conveyor is utilized, a single driving means can be provided for rotating both portions of the screw conveyor. However, where separate screw conveyors are employed, each within separate contacting chamber portions, it is preferred to have first and second driving means for rotating the first and second screw conveyors within their respective contacting chamber portions.

The apparatus of the present invention is preferably constructed with the first screw conveyor portion having a shaft and a helical thread rotatably mounted within the first contacting chamber portion, and the second screw conveyor portion having a helical thread rotatably mounted within the second contacting chamber portion. The apparatus also preferably includes as first agitating means of the first screw conveyor portion a plurality of projections extending substantially parallel to the shaft of the first screw conveyor portion with one of each of the plurality of projections being mounted on the peripheral margin of one of each of the sections of the thread of the first screw conveyor portion, and each of the plurality of projections being diametrally opposed in position on alternate sections of the thread of the first screw conveyor portion. Even more preferably, the plurality of projections comprise rod-shaped members mounted to the peripheral margin of each section of the thread of the first screw conveyor portion with each rod-shaped member extending from the sections of the thread of the screw conveyor portion in the direction in which the solids are conveyed.

It is also preferable in the apparatus of the present invention that the second agitating means of the first screw conveyor portion comprise a plurality of vanes extending outwardly from the shaft of the first screw conveyor portion, and further that the plurality of vanes extend substantially radially, and even more preferably substantially radially and substantially transversely from the shaft of the first screw conveyor portion. In a preferred embodiment, one of each of the plurality of vanes extends from the shaft of the first screw conveyor portion between adjacent sections of the thread thereof and further, extend from the shaft a distance of substantially less than half of the radial distance from the shaft to the periphery of the thread of the first screw conveyor portion.

It is also preferred that the third agitating means positioned along the peripheral margin of the thread of the second screw conveyor portion comprise a plurality of projections extending substantially parallel to the direction of rotation of the second screw conveyor. The projections can be substantially diametrally opposed in position on each section of the thread of the second screw conveyor portion if desired. In a preferred embodiment, the plurality of projections extending from the thread of the second screw conveyor portion are substantially rectangular members extending from the sections of the thread, and can be portions of the thread which have been partially cut from the thread itself and turned downwardly so as to extend substantially parallel to the direction of rotation of the screw conveyor portion.

Preferably, the liquid passage means of the second screw conveyor portion comprise a plurality of apertures spaced from the edge of the sections of the thread. The means can also be slots extending substantially radially in the peripheral margin of the sections of the thread of the second screw conveyor portion, with each of the rectangular members defining the radially inward distance of each of the slots defined in the thread of the second screw conveyor portion. In the instance where the rectangular members of the second screw conveyor portion have been formed from the thread of the second screw conveyor portion and turned downwardly, the partial cutting of the rectangular member from the thread and the turning downwardly define the slots in the sections of the thread with the rectangular members defining the radially inward distance of the slots. In the latter instance, the rectangular members and slots can be formed so as to provide a pair of the members and slots in each section of the thread of the second screw conveyor portion with the pairs being substantially diametrally aligned.

The apparatus of the present invention is preferably constructed so that the means for continuously introducing the liquid into the first contacting chamber portion comprises a liquid inlet into the chamber portion which is positioned so as to introduce liquid substantially at one end of the chamber portion. The apparatus is also preferably constructed with the means for continuously introducing the solid pieces to be treated into the first chamber portion positioned so as to introduce the solid pieces at approximately the same end of the first contacting chamber portion, whereby the solid pieces and liquid are continuously introduced for concurrent contact within the first chamber portion. It is also preferred to provide second means for continuously introducing a liquid into the first contacting chamber portion so that the liquid will be contacted with the solid pieces being conveyed through the first chamber portion, and preferably to have the second means constitute an inlet into the first chamber portion.

The liquid discharge means in communication with the first contacting chamber portion preferably is positioned with respect thereto so as to continuously remove liquid from the chamber portion at a point substantially distant from the first means for introducing liquid into the chamber portion. Positioning of the liquid discharge means in this manner will insure that the liquid is not discharged from the first contacting chamber without having been in substantial contact with the solid pieces being conveyed through the chamber portion prior to the liquid being discharged. Additionally, it is preferred to have the liquid discharge means being operable to continuously remove the controlled amount of liquid from the first chamber portion so as to maintain a level of liquid in the first chamber portion at least above the chips being conveyed and may be above the top of the first screw conveyor portion rotatably mounted within the first chamber portion.

In a preferred construction, the first screw conveyor portion is disposed substantially horizontally, so as to provide for substantial contact between the solid pieces being conveyed thereby with a volume of liquid in the first contacting chamber, and to have the second screw conveyor portion disposed substantially in an inclined position with respect to the first screw conveyor portion, whereby the solid pieces are conveyed successively by the first screw conveyor portion and the second screw conveyor portion. In this preferred construction, it is also preferred to have means for maintaining the level of liquid in the second contacting chamber operable to maintain a minimal level of liquid therein, and preferably substantially less than the length of the second screw conveyor portion and substantially less than the distance from the lower end of the chamber to the position at which liquid is introduced into the chamber. By having the second screw conveyor portion disposed substantially in an inclined manner as compared to the first screw conveyor portion, and providing agitating means and liquid passage means at each section of the thread of the second screw conveyor, the screw conveyor and the chamber within which it is rotatably mounted provides a plurality of discrete step-wise contacting chambers which provide for the efficient mixing and contacting of a liquid passing step-wise downwardly from section to section of the conveyor while the solid pieces are conveyed upwardly through the step-wise chambers and being agitated within each of the imaginary chambers.

In the preferred construction, the first and second screw conveyor portions preferably are separate screw conveyors with the apparatus additionally including conveyor means, such as a continuous belt conveyor within a substantially enclosed chamber for conveying the solid pieces from the first screw conveyor to the second screw conveyor at substantially the lower portion thereof, preferably substantially free of the liquid from the first contacting chamber. It is also preferred in this construction to provide liquid transfer means for transferring liquid from the second contacting chamber into the first contacting chamber, wherein the transferred liquid can constitute the second liquid being introduced into the first contacting chamber.

In the apparatus of the present invention, efficient and economical contacting of a solid with at least one liquid is provided, with the apparatus having application in a number of contacting processes, including the treatment of materials, the reactions of liquids and solids, and the recovery of materials and elements. As heretofore indicated, the apparatus of the present invention has particular application in the recovery of silver from photosensitive film.

In such recovery application, photosensitive film can be cut or chopped into chips which can be continuously introduced into the first contacting chamber through a port positioned in the top adjacent one end of the chamber. A first liquid, which can be an aqueous solution, mixture or suspension of a treating material can be introduced to the chamber substantially at the same end at which the film chips are being introduced. A second liquid can be introduced to the chamber, the second liquid preferably being the liquid removed from the second screw conveyor portion. The film chips are conveyed through the first contacting chamber and agitated by the first agitating means and mixed with the liquid in the chamber by the second agitating means for efficient treatment of the film chips to remove the emulsion film and disperse the emulsion in the contacting liquid. Upon reaching the far end of the contacting chamber, the chips are removed from the chamber, for example, by falling by gravity through a discharge port at an end of the chamber distant from the first end and into the second contacting chamber or onto a conveyor for introduction to the second, inclined screw conveyor portion.

The film chips from the first chamber are then conveyed upwardly through the second contacting chamber as heretofore described, while a rinsing liquid, such as fresh water, can be added to the second contacting chamber at a point distant from the first, lower end, so as to provide step-wise, countercurrent contact of the rinse water with the chips. The freshly introduced rinse water contacts chips which have been substantially rinsed in the higher sections of the second screw conveyor, the rinse water proceeding downwardly, step-wise from section to section through the liquid passage means in each section with the rinse water obtaining an increased concentration of emulsion and silver halide as it proceeds step-wise downwardly the conveyor. The rinse water, particularly if it is removed from the second contacting chamber and introduced as the second liquid into the first contacting conveyor, can be continuously removed along with a portion of the processing liquid from the first contacting chamber, as heretofore described, for further treatment and recovery of silver from the discharged liquid. The treated film chips can be drained in the upper portion of the second screw conveyor as will be hereinafter described, with drained liquid passing downwardly through the liquid passage means in the sections of the thread of the conveyor and mixing with the rinse water being added to the chamber, and the drained chips discharged from the upper end of the second contacting chamber for disposal or further treatment.

In the described application, the first contacting chamber, preferably disposed in a horizontal position, provides desired contact between treating liquid and film chips being conveyed and agitated and mixed with the treating liquid; while in the second contacting chamber, the film chips are conveyed through a series of discrete step-wise rinsing chambers with the chips being contacted with rinse water of successively decreased concentration of materials until finally reaching an area of fresh rinse water and then a draining area before discharge from the apparatus.

In the apparatus of the present invention, greatly efficient contacting is achieved, particularly in the second contacting chamber. For example, if the sections of the thread of the second screw conveyor are constructed approximately six inches apart, a 20 foot screw conveyor constructed in accordance with the invention will have 40 rinsing stages or chambers utilizing a minimal amount of rinsing liquid for highly efficient and economical operation.

BRIEF DESCRIPTION OF THE DRAWING

FIG. 1 is a diagrammatic view, partly in section, of the apparatus of the present invention as employed for the treatment and rinsing of chips;

FIG. 3 is a sectional view taken along lines 3—3 of FIG. 2A; and

FIG. 4 is a sectional view taken along lines 4—4 of FIG. 2B.

BRIEF DESCRIPTION OF A PREFERRED EMBODIMENT

Figure 2A:
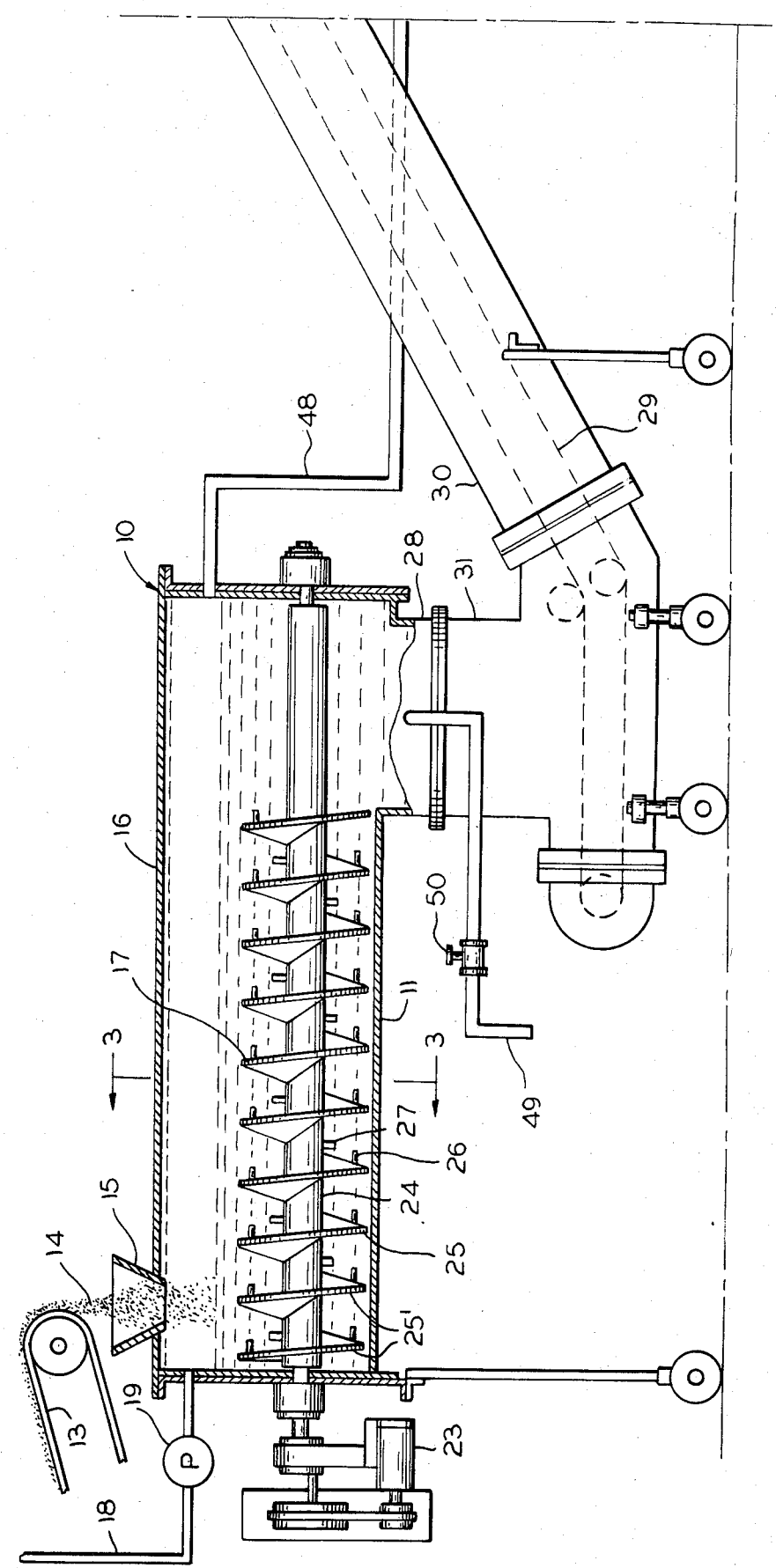
FIG. 2 is a front elevational view, partially in section, showing the apparatus of FIG. 1 in greater detail, with FIG. 2A showing the left half of FIG. 1 and FIG. 2B showing the right half of the apparatus of FIG. 1.

In the particular construction shown in the drawing, the number 10 indicates, generally, apparatus for continuously treating solids with liquids, particularly chips, such as film chips, with liquids, in accordance with the present invention. Apparatus 10 includes a first contacting tank 11 which is generally horizontally disposed, and a second contacting chamber 12, which is substantially inclined as compared to tank 10. As diagrammatically shown in FIGS. 1 and 2, apparatus 10 further includes a conveyor 13 for transporting chips 14 continuously into a hopper 15 positioned in the top or cover 16 of tank 11 to introduce chips 14 continuously to tank 11 and to a first screw conveyor 17 disposed substantially horizontally and rotatably mounted within tank 11. Additionally, a conduit 18 and pump 19 are provided to continuously introduce a treatment solution into tank 11 at the same end of the tank as hopper 15 is located to provide for concurrent contact of chips 14 with the treatment solution. As shown at the right end of FIG. 1 and in FIG. 2B, chamber 12 is provided with a discharge port 20 and a receptacle or bin 21 into which processed chips, for convenience referred to as chips 14, are deposited upon completion of treatment in apparatus 10.

Referring to FIGS. 1 and 2A, a screw conveyor 17, which is substantially horizontally disposed, is rotatably mounted within tank 11. Screw conveyor 17 is rotated by driving means, generally indicated by numeral 23, which may comprise a motor, gears or belts and journals, as diagrammatically shown. Screw conveyor 17 includes a shaft 24 and a helical thread 25 wound about and fixed to shaft 24. A plurality of rod-shaped members 26 are mounted to and project from the sections 25' of thread 25, members 26 extending substantially parallel to shaft 24, with each of the members 26 being mounted on the peripheral margin of one of sections 25' and each member 26 being diametrally opposed in position on alternate sections 25' of thread 25. Members 26 can be pins, mounted, for example, by welding, on sections 25'. Conveyor 17 is also equipped with a plurality of vanes 27 which extend substantially radially and substantially transversely from shaft 24, as particularly shown in FIG. 3. Vanes 27 extend from shaft 24 between adjacent sections 25' of thread 25, as shown, and extend therefrom for a distance of substantially less than half of the radial distance from shaft 24 to the periphery of the thread 25. As shown in FIG. 3, thread 25 of screw conveyor 17 occupies substantially all of the bottom region of tank 11 so as to provide for the contacting and conveyance of all of chips 14 being conveyed through tank 11.

Tank 11 is provided with a discharge port of flange 28 through which chips are conveyed and allowed to drop after having been conveyed by conveyor 17 toward the right end of tank 11 distant from the end into which chips 14 were introduced. The lower end of a continuous conveyor belt 29 is positioned beneath flange 28 to receive chips 14 falling onto the belt by gravity. A housing 30 surrounds the belt 29 and has a flange 31 integral therewith and is coupled to flange 28 in liquid communication therewith. Housing 30 provides a fluid-tight seal with tank 11 and permits a water level, as indicated in FIG. 1, to be maintained both in tank 11 and housing 30. Housing 30 is inclined and extends upwardly so that the upper end thereof extends above the liquid level maintained in tank 10. Belt 29 is positioned so as to transport chips 14 from beneath tank 11 upwardly above the liquid level so as to be transported substantially free of liquid from tank 11 through a discharge funnel 32 and a chute 33 into chamber 12.

Chamber 12 can be formed of a cylindrical tank 34 having end plates 35 within which is rotatably mounted second screw conveyor 36. As in the case of screw conveyor 17, driving means, generally indicated by numeral 37 is provided, which may include a motor and gears, belts and the like and supporting journals for rotating screw conveyor 36. Tank 34 is provided with an inlet port or flange 38 through which chute 33 extends to continuously introduce chips 14 from tank 11 and belt 29 to tank 34. Tank 34 is substantially inclined with respect to the position of tank 11 and conveyor 17 so as to convey chips 14 upwardly from a lower end to a higher end of tank 34. Flange 38 is provided substantially adjacent the lower end of tank 34 so as to continuously introduce chips 14 to the lower end of tank 34, and hence the lower end of conveyor 36.

Screw conveyor 36 comprises a shaft 39 and a helical thread 40 having sections 40' wound about and fixed to shaft 39. Tank 34 closely surrounds thread 40, as best shown in FIG. 4. A plurality of substantially rectangular members 41 extend from sections 40' of thread 40 and extend substantially parallel to shaft 39, and hence substantially parallel to the direction of rotation of screw conveyor 36. Members 41 are substantially diametrally opposed in position on each section 40' of thread 40, and are substantially rectangular in shape. Members 41 are preferably formed from thread 40 by forming two parallel cuts on a diametral center line and turning the cut material downwardly so as to extend substantially parallel to shaft 39. Formation in this manner provides that the sections 40' of thread 40 define substantially rectangular slots 42 whose radially inward distance from the periphery of thread 40 is defined by members 41. Slots 42 constitute liquid passage means in sections 40' of thread 40 for the passage of liquid therethrough. Conveyor 36 extends less than the full length of shaft 39 and provides a portion of tank 34 at its upper end into which thread 40 does not extend. Chips 14 conveyed upwardly by conveyor 36 are thus conveyed into the area at which thread 40 does not extend, and chips 14 are thus permitted to be discharged from tank 34 through discharge flange 20 and into bin 21 for collection.

Figure 2B:
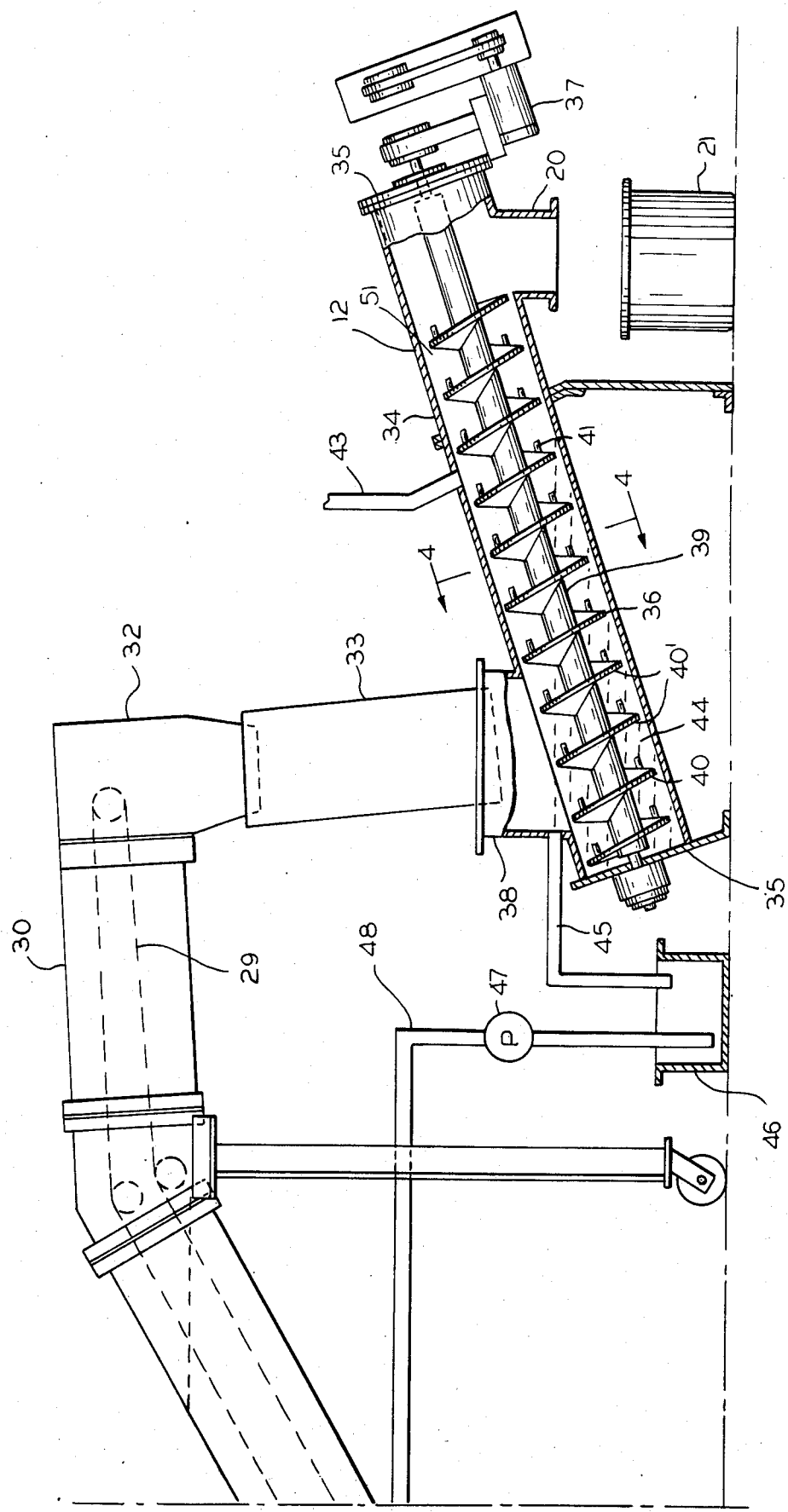

A conduit 43 is provided into tank 34 for the continuous introduction of a liquid, for example, a wash or rinse liquid 44. Tank 34 is also provided with a liquid discharge conduit 45 which is positioned in flange 38 at a predetermined height so as to maintain a level of liquid in tank 34 as shown in FIGS. 1 and 2B so that only the lower portion of conveyor 36 is covered with the liquid 44, and another substantial, major portion of conveyor 36 remains above the level of liquid 44. Liquid discharge conduit 45 conducts the discharge liquid 44 into a tank 46 from which it is pumped by pump 47 through a conduit 48 back to tank 11 to provide a second liquid to that tank to mix with and contact chips 14 therein. Liquid 44 which is introduced into tank 11 becomes part of the bulk of the liquid therein and in housing 30.

A conduit 49 is provided in liquid communication with tank 11 to function as liquid discharge means for continuously removing an amount of liquid from tank 11. A valve 50 in conduit 49 controls the amount of liquid being removed from tank 11. Conduit 49 is positioned generally at the lower portion of tank 11, and adjacent the end of the tank distant from the end of the tank at which treatment solution is introduced through conduit 18. Positioning conduit 49 in this manner permits the treatment solution to be contacted with chips 14 as the chips are conveyed by conveyor 17, prior to discharge of the solution and liquid 44 through conduit 49. Conduit 49 is conveniently positioned in flange 28 as shown. Valve 50 is controlled in the operation of the apparatus so as to maintain a level of liquid in tank 11 at least above the level of chips 14 being conveyed by conveyor 17, and preferably above the top of shaft 24, and may even be above thread 25 of conveyor 17, if desired. Liquid removed through conduit 49 contains material removed and rinsed from chips 14, and can be further treated to recover the material therefrom.

Conveyor 36, having its thread 40 extending above the level of liquid in tank 34, and extending upwardly past the area where rinse liquid 44 is introduced through conduit 43, provides for the transport of chips 14 into a drying or draining section 51 within tank 34. After leaving section 51, the chips 14 are discharged through flange 20 and into bin 21 as heretofore described. Chips 14 can then be further processed if desired.

The apparatus thus described can be utilized for performing a variety of applications requiring the contacting of solids with one or more liquids, and for the rinsing of solids in an efficient and economical manner. The apparatus is particularly adapted for the treatment of photosensitive film to recover metals, such as silver, where the efficiency and high throughput of film chips through the apparatus provides processing and economic advantages not attained by the apparatus heretofore known for such processing or for the contacting of solids with liquids.

Various changes coming within the spirit of the described invention may suggest themselves to those skilled in the art; hence, the invention is not limited to the specific embodiments shown and described or the uses mentioned, but the same is intended to be merely exemplary, the scope of the invention being limited only by the appended claims.

What is claimed is:

1. Apparatus for continuously treating solid pieces with at least one liquid comprising:
   a. first contacting means for contacting the solid pieces with a liquid including a first contacting chamber portion and a first screw conveyor portion having a shaft and a helical thread rotatably mounted within said chamber portion for conveying the solid pieces through said chamber portion;
   b. driving means for rotating said first screw conveyor portion within said first contacting chamber portion;
   c. means for continuously introducing the solid pieces to be treated into said first contacting chamber portion substantially at one end of said chamber portion and into said first screw conveyor portion;
   d. first agitating means positioned along the peripheral margin of each section of the thread of said first screw conveyor portion for agitating the solid pieces being conveyed thereby in the area between adjacent sections of thread of said first screw conveyor portion;
   e. means for continuously introducing into said first chamber portion at said one end thereof a liquid to be contained with the solid pieces being conveyed therethrough;
   f. second agitating means positioned along said shaft of said first screw conveyor portion for mixing the liquid with the solid pieces being conveyed thereby within the area between adjacent sections of the thread of said first screw conveyor portion;
   g. liquid discharge means in communication with said first chamber portion for continuously removing a controlled amount of liquid from said chamber portion whereby a level of liquid is maintained in the first chamber portion at least above the level of solid pieces being conveyed therethrough;
   h. second contacting means for contacting the solid pieces from said first contacting means with a liquid including a second, substantially inclined contacting chamber portion and a second screw conveyor portion having a helical thread rotatably mounted within said second contacting chamber portion for conveying the solid pieces through said second chamber portion from a first lower end portion of said chamber to a second higher end portion of said chamber;
   i. driving means for rotating said second screw conveyor portion within said second contacting chamber portion;
   j. means for continuously introducing a liquid into said second chamber portion to be contacted with the solid pieces being conveyed therethrough;
   k. third agitating means positioned along the peripheral margin of each section of the thread of said second screw conveyor portion for agitating the solid pieces being conveyed through said second chamber portion in the area between adjacent sections of the thread of said second screw conveyor portion;
   l. liquid passage means associated with the peripheral margin of each section of the thread of said second screw conveyor portion for allowing liquid to pass through said sections; and
   m. discharge means for removing solid pieces from said second contacting means.

2. The apparatus defined in claim 1, wherein said first agitating means comprises a plurality of projections extending substantially parallel to said shaft of said first screw conveyor portion, one of each of the said plurality of projections being mounted on the peripheral margin of one of each of the sections of the thread of said first screw conveyor portion and each of said plurality of projections being diametrally opposed in position on alternate sections of the thread of said first screw conveyor portion.

3. The apparatus as defined in claim 2, wherein said plurality of projections comprise rod-shaped members mounted to said peripheral margin of each section of the thread of said first screw conveyor portion, and each rod-shaped member extending from the sections of the thread of the screw conveyor portion in the direction in which solids are conveyed by the first screw conveyor portion.

4. The apparatus as defined in claim 1, wherein said means for continuously introducing into said first chamber portion a liquid to be contacted with the solid pieces being conveyed through said chamber portion comprises a liquid inlet into said chamber portion positioned so as to introduce liquid substantially at said one end of the chamber portion.

5. The apparatus as defined in claim 4, wherein said means for continually introducing the solid pieces to be treated into said first contacting chamber portion is positioned so as to introduce the solid pieces at approximately the same end of the said first contacting chamber portion as said inlet, whereby the solid pieces to be treated and the liquid to be contacted with the solid pieces are continuously introduced into said first chamber portion for concurrent contact within the said first chamber portion.

6. The apparatus as defined in claim 1, including second means for continuously introducing into said first chamber portion a liquid to be contacted with the solid pieces being conveyed through said first chamber portion.

7. The apparatus as defined in claim 1, wherein said second agitating means comprise a plurality of vanes extending outwardly from said shaft of said first screw conveyor portion.

8. The apparatus as defined in claim 7, wherein said plurality of vanes extend substantially radially from said shaft.

9. The apparatus as defined in claim 8, wherein each of said plurality of vanes extends substantially radially and substantially transversely from said shaft of said first screw conveyor portion.

10. The apparatus as defined in claim 9, wherein one of each of said plurality of vanes extends from said shaft of said first screw conveyor portion between adjacent sections of the thread of said first screw conveyor portion.

11. The apparatus as defined in claim 10, wherein said plurality of vanes extend from said shaft of said first screw conveyor portion a distance of substantially less than half of the radial distance from the said shaft to the periphery of the thread of said first screw conveyor portion.

12. The apparatus as defined in claim 1, wherein said liquid discharge means in communication with said first chamber portion is positioned with respect to said first chamber portion so as to continuously remove liquid from said chamber portion at a point substantially distant from said means for continuously introducing into said first chamber portion a liquid to be contacted with the solid pieces being conveyed through said first chamber portion.

13. The apparatus as defined in claim 12, wherein said liquid discharge means is operable to continuously remove the controlled amount of liquid from said first chamber portion so as to maintain a level of liquid in said first chamber portion above the top of the shaft of said first screw conveyor portion rotatably mounted within said first chamber portion.

14. The apparatus as defined in claim 1, wherein said third agitating means positioned along the peripheral margin of each section of the thread of said second screw conveyor portion comprises a plurality of projections extending substantially parallel to the direction of rotation of said second screw conveyor portion.

15. The apparatus as defined in claim 14, wherein said plurality of projections comprise substantially rectangular members extending from said sections of the thread of said second screw conveyor portion.

16. The apparatus as defined in claim 15, wherein said liquid passage means comprise a plurality of slots extending substantially radially in the peripheral margin of the sections of the thread of said second screw conveyor portion, with each of said rectangular members defining the radially inward distance of each of the slots defined in the sections of the thread of said second screw conveyor portion.

17. The apparatus as defined in claim 16, wherein a pair of rectangular members extend from each section of the thread of said second screw conveyor portion, the pair of slots in each section of the thread of said second screw conveyor portion being substantially diametrally aligned.

18. The apparatus as defined in claim 1, wherein said first screw conveyor portion is disposed substantially horizontally and said second screw conveyor portion is disposed substantially inclined with respect to said first screw conveyor portion, whereby the solid pieces are conveyed successively by said first screw conveyor portion and said second screw conveyor portion.

19. The apparatus as defined in claim 18, wherein said first and second screw conveyor portions comprise separate screw conveyors, said apparatus additionally including conveyor means for conveying solid pieces from said first screw conveyor to said second screw conveyor at substantially the lower portion thereof, and liquid transfer means for transferring liquid from said second contacting chamber into said first contacting chamber.

20. Apparatus for continuously contacting solid chips with at least two liquids, comprising:
   a. first contacting means for contacting the solid chips with a first and second liquid, said first contacting means including a first, substantially horizontally disposed contacting chamber and a first, substantially horizontally disposed screw conveyor having a shaft and a helical thread rotatably mounted within said chamber for conveying the solid chips from a first end portion of said chamber to a second end portion of said chamber;
   b. first driving means for rotating said first screw conveyor within said first contacting chamber;
   c. means for continuously introducing solid chips to be treated into said first contacting chamber adjacent the first end portion thereof, whereby the first screw conveyor is operable to convey the solid chips from said first end portion of the chamber to the second end portion of the chamber;
   d. said first screw conveyor having a plurality of agitating projections with one of each of said projections being mounted along the peripheral margin of each section of the thread of said first screw conveyor for agitating the solid chips being conveyed thereby in the area between that section and the section adjacent thereto in the direction in which the projections extend, each of said projections being diametrically opposed in position on alternate sections of the thread of said first screw conveyor;
   e. means for continuously introducing a first liquid into said first end portion of said first contacting chamber for concurrent contact with the solid chips introduced by said means for continuously introducing the solid chips;
   f. means for continuously introducing a second liquid into substantially the second end portion of said first contacting chamber;
   g. a plurality of agitating means positioned along said shaft of said first screw conveyor for mixing the first and second liquids in the first contacting chamber with the solid chips within the area between adjacent sections of the thread of said first screw conveyor, one of said plurality of agitating means extending outwardly, substantially radially and substantially transversely from said shaft between each adjacent sections of the thread of said first screw conveyor;
   h. liquid discharge means in communication with said first contacting chamber for continuously moving a controlled amount of liquid from said chamber whereby a level of liquid is maintained in the chamber at least above the level of solid chips being conveyed therethrough;

i. second contacting means for contacting the solid chips from said first contacting means with the liquid, said second contacting means including a second, substantially inclined contacting chamber and a second, substantially inclined screw conveyor having a helical thread rotatably mounted within said second contacting chamber for conveying the solid chips from a first, lower end portion of said chamber to a second, higher end portion of said chamber;

j. second driving means for rotating said second screw conveyor within said second contacting chamber;

k. means for continuously removing solid chips from said first contacting chamber and for introducing the solid chips removed from said first contacting chamber continuously into said second contacting chamber adjacent the first, lower, end portion thereof;

l. means for continuously introducing a liquid into said second contacting chamber at a point distant from the said first, lower end portion of the chamber and substantially downwardly along the chamber from the upper end of the second screw conveyor;

m. means for removing liquid from said second contacting chamber, for transporting said removed liquid to said means for continuously introducing a second liquid into said first contacting chamber whereby the liquid removed from the second contacting chamber constitutes the second liquid introduced into the first contacting chamber, and for maintaining a level of liquid in said second contacting chamber at substantially less than the length of the second screw conveyor portion rotatably mounted therein;

n. third agitating means positioned along the peripheral margin of each section of the thread of said second screw conveyor for agitating the solid chips being conveyed through said second contacting chamber in the area between adjacent sections of the thread of said second screw conveyor;

o. said second screw conveyor having a plurality of agitating projections with at least one of each of said projections being mounted along the peripheral margin of each section of the thread of said second screw conveyor for agitating the solid chips being conveyed through said second contacting chamber in the area between adjacent sections of the thread of said second screw conveyor;

p. liquid passage means associated with the peripheral margin of each section of the thread of said second screw conveyor for allowing liquid to pass through said sections, said liquid passage means comprising a plurality of slots extending substantially radially in the peripheral margin of the sections of the thread of said second screw conveyor, with each of said plurality of agitating projections extending from said sections of the thread of said second screw conveyor defining the radially inward distance of each of the slots defined in the sections of the thread of said second screw conveyor; and q. discharge means for removing solid chips from said second contacting chamber substantially adjacent the second, higher end thereof, whereby the solid chips conveyed by said second screw conveyor are conveyed beyond the position at which liquid is introduced into said second contacting chamber by said means for continuously introducing a liquid into said chamber for a substantial distance prior to discharge therefrom, said substantial distance of said second contacting chamber through which the solid chips are conveyed by said second screw conveyor above the position at which said means for continuously introducing a liquid introduces the liquid constituting a draining area prior to discharge of the chips from said apparatus.

* * * * *

UNITED STATES PATENT AND TRADEMARK OFFICE
CERTIFICATE OF CORRECTION

PATENT NO. : 4,611,612

DATED : September 16, 1986

INVENTOR(S) : John P. Obie and Thomas L. Faudree

It is certified that error appears in the above-identified patent and that said Letters Patent is hereby corrected as shown below:

```
Claim 1, Column 9, line 62, "contained" should be
     --contacted--;

Claim 20, Column 12, line 65 "sections" should be
     --section--.
```

Signed and Sealed this

Twelfth Day of April, 1988

*Attest:*

DONALD J. QUIGG

*Attesting Officer*   *Commissioner of Patents and Trademarks*